United States Patent [19]

Allahverdian

[11] 4,411,066
[45] Oct. 25, 1983

[54] CAKE CUTTER

[76] Inventor: Edward Allahverdian, 426 Wing St., #3, Glendale, Calif. 91705

[21] Appl. No.: 456,281

[22] Filed: Jan. 6, 1983

[51] Int. Cl.³ .......................................... A21C 15/04
[52] U.S. Cl. .................................................. 30/114
[58] Field of Search ................... 30/114, 115, 279 R, 30/279 A, 283

[56] References Cited

U.S. PATENT DOCUMENTS

| 827,622 | 7/1906 | Ericson | 30/115 |
| 2,571,465 | 10/1951 | McDevitt | 30/114 |
| 2,679,687 | 6/1954 | Ledbetter | 30/114 |
| 2,770,035 | 11/1956 | O'Brien | 30/114 |
| 2,841,868 | 7/1958 | O'Brien | 30/114 |
| 3,838,510 | 10/1974 | Kelly | 30/279 A |
| 4,000,395 | 12/1976 | Fischer | 30/116 |

Primary Examiner—E. R. Kazenske
Assistant Examiner—Paul M. Heyrana, Sr.
Attorney, Agent, or Firm—John Joseph Hall

[57] ABSTRACT

A cake cutter device having a polymorphic shaped cutting blade removably attached to a gear housing with rack and pinion device in conjunction with a plate to determine the length, and a helical screw in conjunction with the cutting blade to determine the width of a piece of cake to be cut, and a member to secure the cut portion of cake in position with the cutting blade for serving the cut piece of cake, which cut portion may be in a polymorphic shape as desired.

12 Claims, 7 Drawing Figures

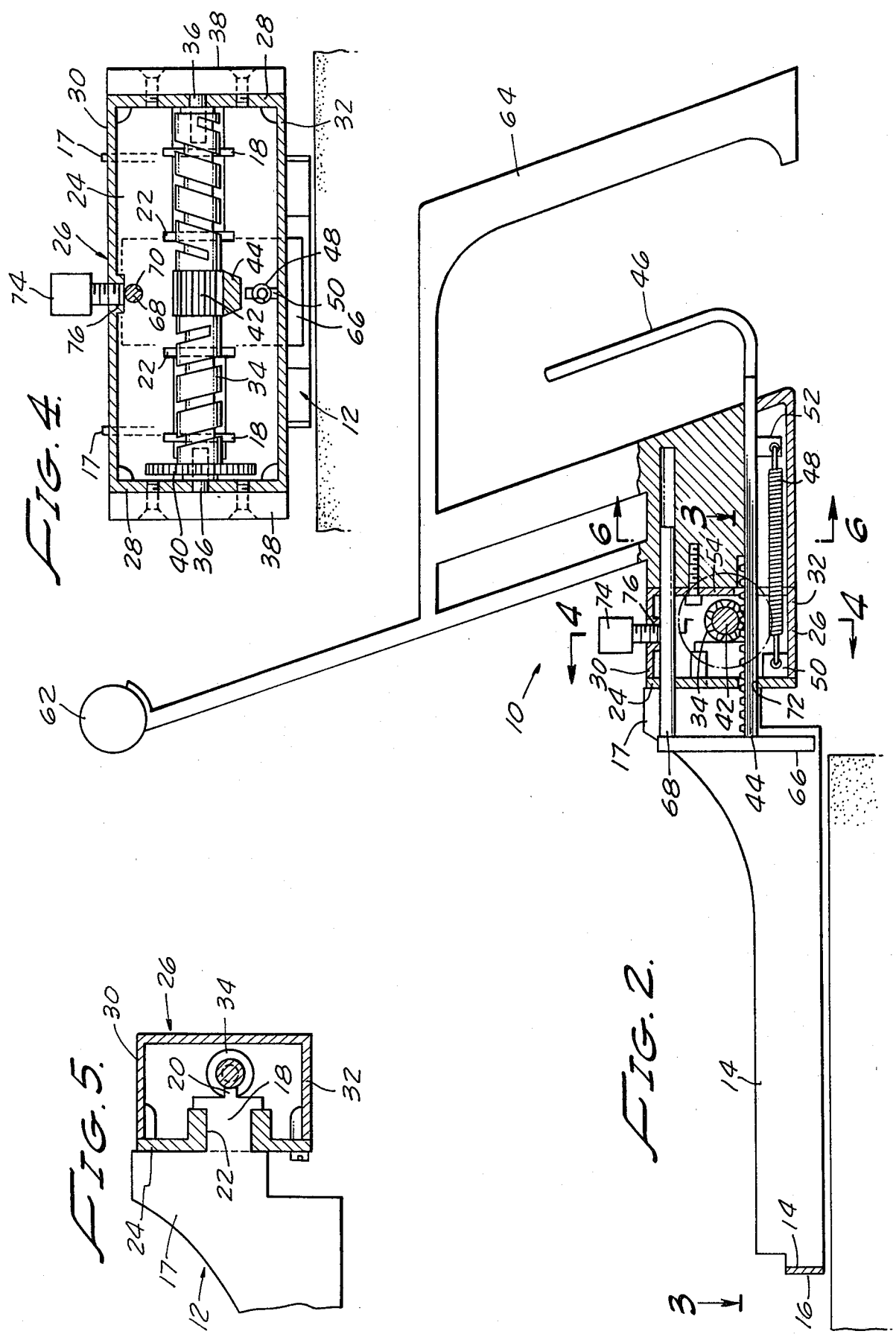

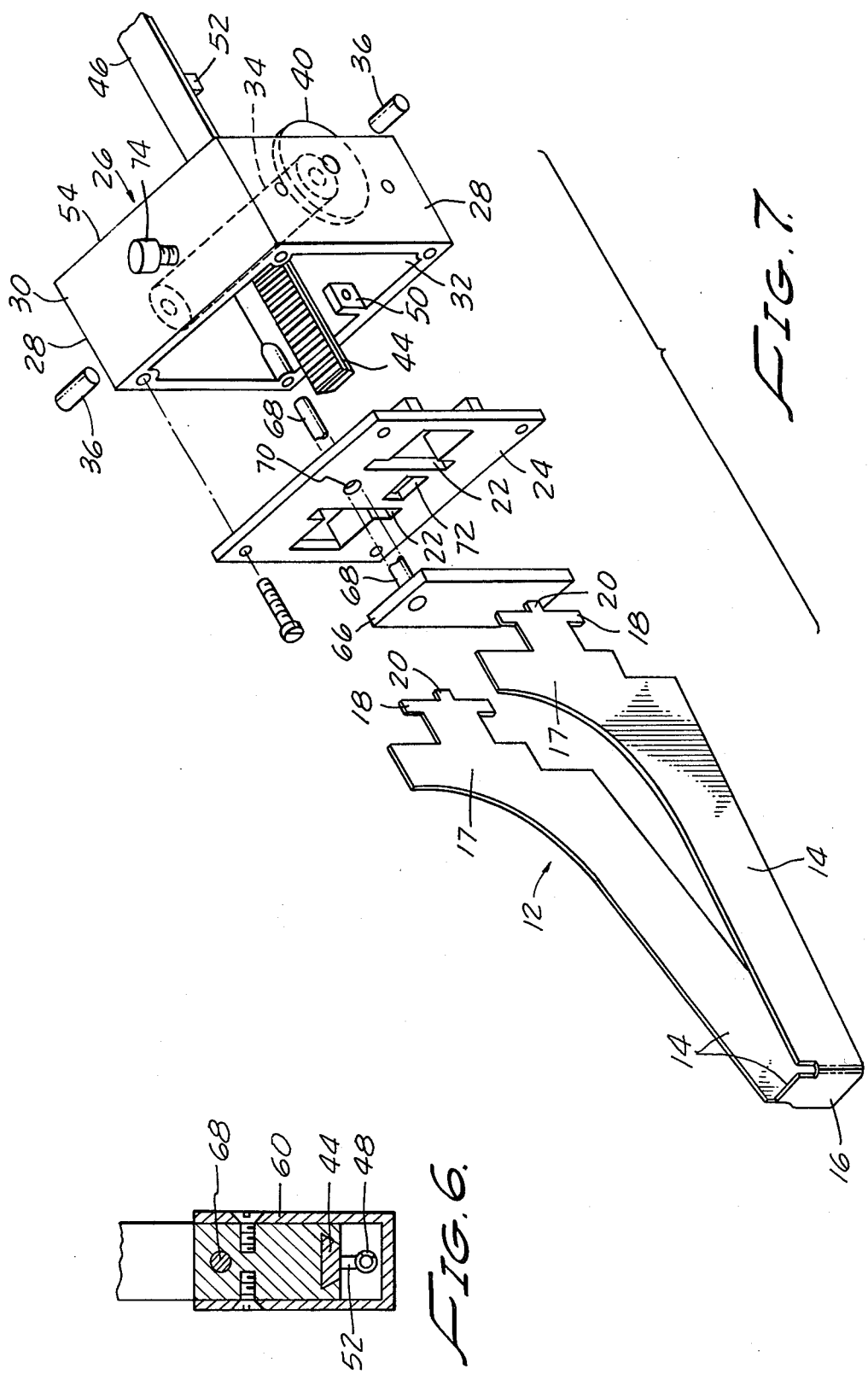

4,411,066

CAKE CUTTER

SUMMARY OF INVENTION

This invention relates to cake cutting devices and provides a cake cutting device with a new and improved mechanism for cutting and serving various sizes and shapes of portions of a cake, which mechanism and capability are not known in the prior art. For example, the U.S. Pat. No. 2,679,787, features a combined cutter and server for a cake with a rigid actuator limited to V-shaped slices of cake which are one or two or three (1", 2", 3") inches in width only, and has no mechanism or capability of providing various other sizes or shapes of the cake portion to be cut, either by width or length or form, or dual means for cutting and serving the cut portion of cake. The same is true of U.S. Pat. Nos. 2,622,912 and 2,571,465, which are limited to cake and pie cutters that allow the cut portion of pie or cake to be lifted up for serving, but lack means of capability for varying the piece to be cut over a wide range, either by length or width or shape.

The present invention provides a reliable means for varying not only the width of the portion of the cake to be cut by helical screw means, but also the length and shape of the piece of cake to be cut by rack and pinion means simultaneously. Moreover, the cutting blade is in one piece and can be easily detached for washing and reattachment, and provides the dual function of cutting the cake and serving the cut portion of the cake.

Accordingly, the invention provides securing means for securely holding the cut portion of the cake and removing it from the remaining cake for serving as desired by spring actuated rack and pinion means in conjunction with the cutting blade.

It is, therefore, an object of my invention to provide a cake cutter with the capability of varying the width and shape of a portion of a cake to be cut as desired.

Another object of my invention is to provide a cake cutter with the capability of varying the length of the portion of cake to be cut, simultaneously with the selection of a particular width of the portion of the cake to be cut.

A further object of my invention is to provide a cake cutter with the capability of securely holding a piece of cake after it has been cut and removing it from the remaining cake for serving as desired.

A still further object of my invention is to provide a cake cutter with the capability of cutting a portion of a cake in any desired shape without any limitation to a V-shape or any other particular shape.

A yet further object of my invention is to provide a cake cutter having a cutting blade with the capability of combining the function of cutting the cake with the function of securing the cut portion of the cake and serving it as desired.

These and other objects will be more readily understood by reference to the following description and accompanying drawings, in which FIG. 1 is a perspective view of a preferred embodiment illustrating the cake cutter in the process of cutting cake.

FIG. 2 is a vertical cross section taken on line 2—2 of FIG. 1.

FIG. 4 is a vertical cross section taken on line 4—4 of FIG. 2.

FIG. 5 is a fragmentary cross section taken on line 5—5 of FIG. 3.

FIG. 6 is a vertical cross section taken on line 6—6 of FIG. 2.

FIG. 7 is an exploded perspective view illustrating principal components of a preferred embodiment of the invention.

Figure 1:
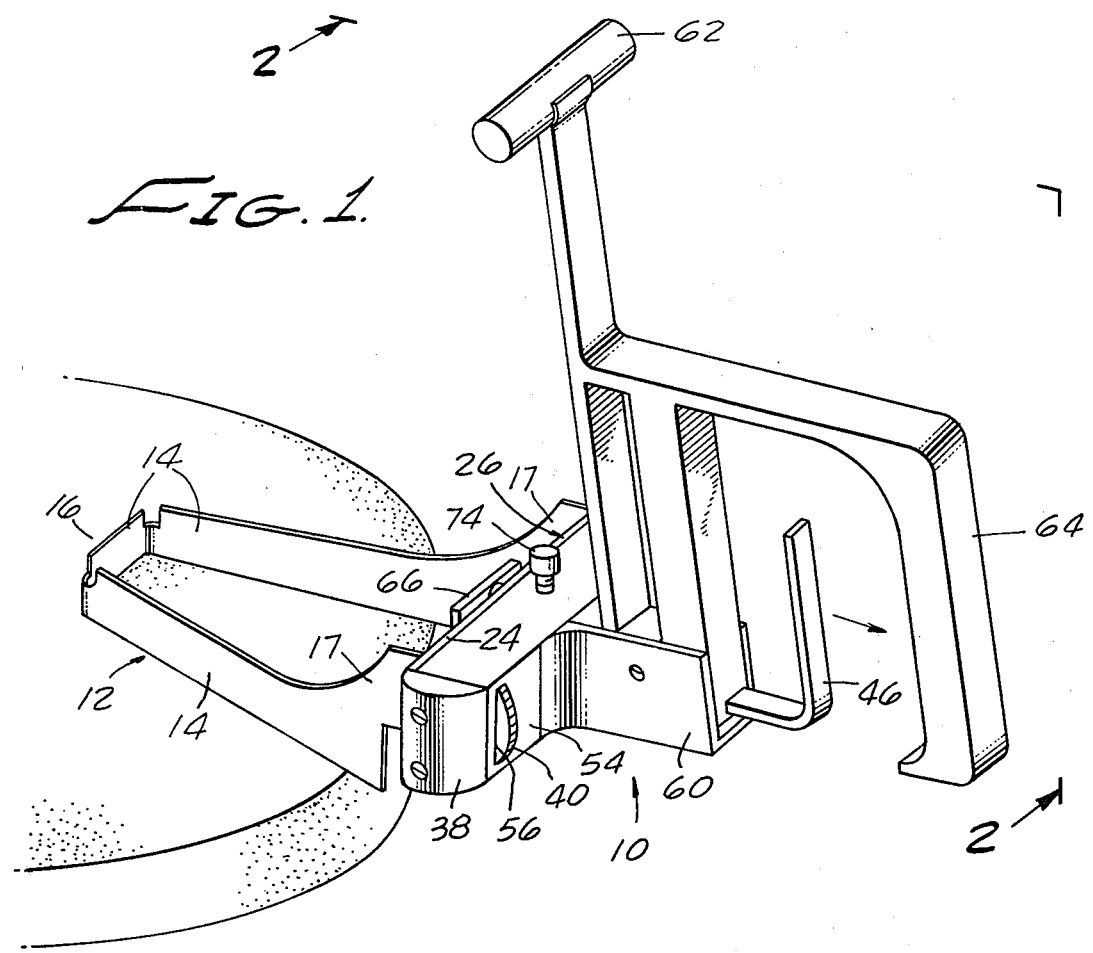
Figure 3:
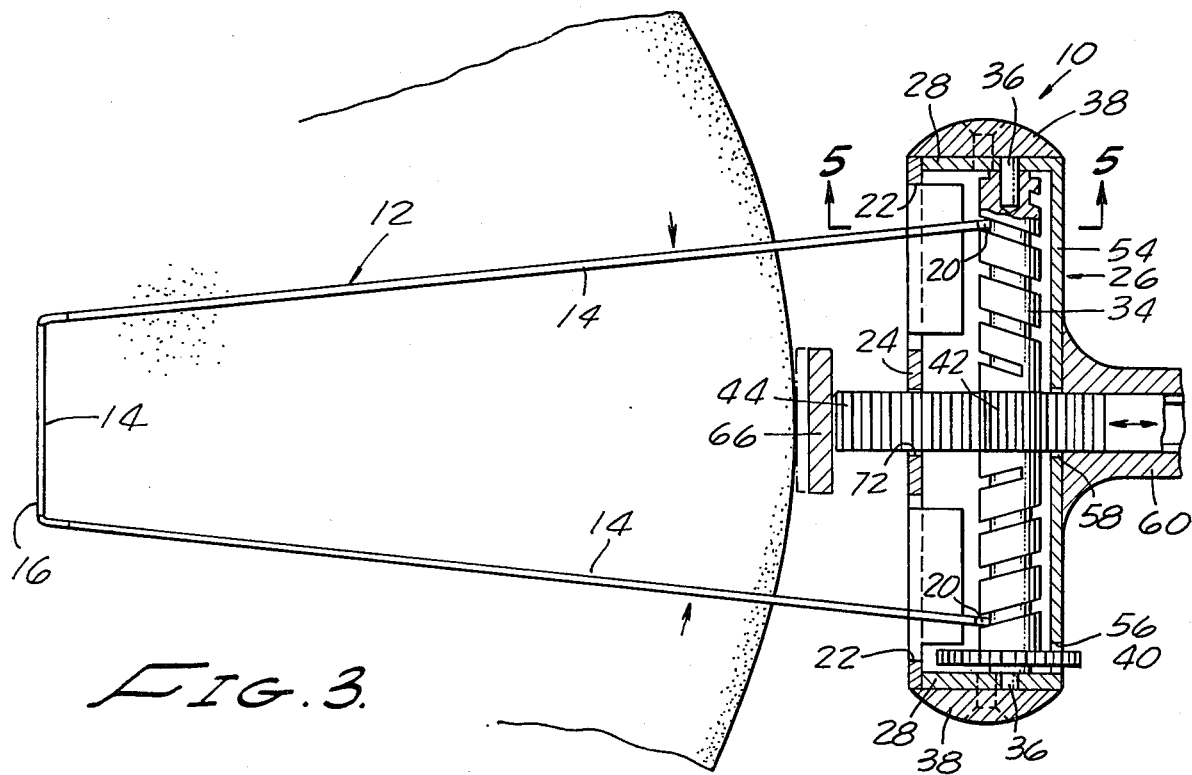
FIG. 3 is a horizontal cross section taken on line 3—3 of FIG. 2.

The cake cutter 10 has a cutter blade 12 which is shown in one embodiment as being formed in a triangular shape with three cutting sides including two longitudinal cutting sides 14 substantially longer than the apex cutting side 16. Cutting blade 12 is not limited in shape to the embodiment shown in the drawings but may be polymorphic or polymorphous in shape in that cutting blade 12 may be formed from a single piece of suitably resilient material, such as spring steel or plastic, into various shapes such as circular, rectangular, trapezoidal, or various other shapes of various kinds within the scope of the invention.

Each of the inner ends 17 of the longitudinal cutting sides 14 is formed into a flange 18 with a projection 20. The inner ends 17 of the longitudinal cutting sides 14 fit into slots 22 of a front plate 24, fastened by any suitable means to housing 26, which has side walls 28, a top wall 30 and a bottom wall 32.

A pitched lead screw 34 is journaled perpendicularly to the plane of front plate 24 into each side wall 28 by pin 36 locked in place by end caps 38. One end of lead screw 34 is provided with a width regulating wheel 40 mounted thereon.

Lead screw 34 is formed in two pieces, each having vertical grooves milled into one of the pieces with helical pitches to the right of center and the other piece with helical pitches to the left of center which accommodate the projection 20 of longitudinal cutting sides 14 of cutting blade 12. The center of lead screw 34 is provided with a pinion 42. Pinion 42 cooperates with the rack portion 44 of separating handle 46.

Actuating spring 48 is connected at its inner end to anchor member 50 formed on the top surface of bottom wall 32 of housing 26 and its outer end is connected to anchor member 52 formed on the bottom surface of separating handle 46.

The rear wall 54 of housing 26 has a slot 56 to accomodate the protrusion of a portion of regulating wheel 40 and an opening 58 to accommodate the insertion of the rack portion 44 of cutting handle 46.

A support member 60 is mounted on the rear wall 54 of housing 26 to serve as a base for pushing handle 62 and lifting handle 64, and as a guide for the rack portion 44 and for separating handle 46.

A length limiting plate 66 is located in front of front plate 24 and is provided with a pin 68 which is inserted through an opening 70 of front plate 24.

Front plate 24 is provided with a rack slot 72 through which rack portion 44 is inserted to bear against the rear of length limiting plate 66.

Set screw 74 is inserted into an opening 76 of the top wall 30 of housing 26 and bears against pin 68.

In operation, the cake cutter 10 is held by means of lifting handle 64 by an operator over the cake to be cut. The width of cutting blade 12 is adjusted to the desired amount of cake to be cut by adjusting regulating wheel 40, which turns lead screw 34, thereby moving longitudinal cutting sides 14 apart or together as desired.

The length of the piece of cake to be cut is selected by adjusting the position of length limiting plate 66 forward or backward by set screw 74 in conjunction with the spring urged rack portion 44 of separating handle 46.

The cake cutter 10 is then lowered to the surface of the cake and pushed down by pushing handle 62 to cut the desired piece of cake.

After the piece of cake is cut, the operator pulls back on separating handle 46, thereby causing the longitudinal cutting sides 14 to move towards each other through the action of the rack portion 44 of separating handle 46 and pinion 42 of lead screw 34, whereby the cut piece of cake is securely held by the longitudinal cutting sides 14. The cake cutter 10 is then lifted up from the remaining cake by lifting handle 64, and the cut piece of cake is then deposited as desired by releasing the separating handle 46.

Although I have described my invention in detail with reference to the accompanying drawings illustrating a preferred embodiment of my invention, it is understood that numerous changes in the details of construction and arrangement of parts may be made without departing from the spirit and scope of the invention as hereinafter claimed.

I claim:

1. A cake cutter comprising:
   a housing having a top wall, a bottom wall, a rear wall, two side walls and a front plate;
   a helical screw member having one side with helixes diverging to the right of center and the other side with helixes diverging to the left of center, and journaled into said side walls of said housing;
   a pinion mounted on said helical screw member;
   a three sided cutting blade having an apex end and two longitudinal sides, with the inner ends of said longitudinal sides formed to ride respectively on the helixes of said screw member;
   a length limiting plate located in front of said front plate, and maintained in position by securing means; and
   rack means having a handle member for moving said longitudinal cutter sides towards each other in conjunction with said pinion and said helical screw to secure a cut portion of a cake.

2. A cake cutter according to claim 1 in which said cake cutter is provided with a lifting handle.

3. A cake cutter according to claim 1 in which said cake cutter is provided with a pushing handle.

4. A cake cutter according to claim 1 in which the securing means for said length limiting plate is screw and pin means.

5. A cake cutter comprising:
   a housing having a top wall, a bottom wall, a rear wall, a front plate and two side walls;
   a helical screw member having one side with helixes diverging to the right of center and the other side with helixes diverging to the left of center, and journaled into said side walls of said housing;
   a pinion mounted on said helical screw member;
   a polymorphic shaped cutting blade having inner ends formed to ride respectively on the helixes of said screw member;
   a length limiting plate located in front of said front plate of said housing and maintained in position by securing means; and
   rack means having a handle member for moving said longitudinal cutter sides towards each other in conjunction with said pinion and said helical screw to secure a cut portion of a cake.

6. A cake cutter according to claim 5 in which said cake cutter is provided with a lifting handle.

7. A cake cutter according to claim 5 in which said cake cutter is provided with a pushing handle.

8. A cake cutter according to claim 5 in which the securing means for said length limiting plate is screw and pin means.

9. A cake cutter comprising:
   a housing having a top wall, a bottom wall, a rear wall, two side walls, and a front plate;
   a helical screw member having one side with helixes diverging to the right of center and the other side with helixes diverging to the left of center, and journaled into said side walls of said housing;
   a pinion mounted on said helical screw member;
   a polymorphic cutting blade means having inner ends formed to ride respectively on said helixes of said screw member;
   a length limiting plate located in front of said front plate of said housing and maintained in position by securing means; and
   rack means having a handle member for moving said inner sides of said polymorphic cutting blade means to a predetermined position for cutting a portion of the cake in conjunction with said polymorphic cutting blade means and thereafter for moving said inner ends of said polymorphic cutting blades means towards each other in conjunction with said pinion and said helical screw to secure a cut portion of cake.

10. A cake cutter according to claim 9 in which said cake cutter is provided with a lifting handle.

11. A cake cutter according to claim 9 in which said cake cutter is provided with a pushing handle.

12. A cake cutter according to claim 9 in which the securing means for said length limiting plate is screw and pin means.

* * * * *